(12) United States Patent
Kim (10) Patent No.: US 7,259,811 B2
(45) Date of Patent: Aug. 21, 2007

(54) COLOR FILTER SUBSTRATE FOR LIQUID CRYSTAL DISPLAY DEVICE AND FABRICATING METHOD THEREOF

(75) Inventor: Sam Yeoul Kim, Osan-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/747,176

(22) Filed: Dec. 30, 2003

(65) Prior Publication Data
US 2004/0169794 A1    Sep. 2, 2004

(30) Foreign Application Priority Data
Feb. 28, 2003    (KR) ................ 10-2003-0012539

(51) Int. Cl.
*G02F 1/1335* (2006.01)
(52) U.S. Cl. ...................... 349/106; 349/110
(58) Field of Classification Search ............. 349/106, 349/110; 345/88; 430/7
See application file for complete search history.

(56) References Cited

U.S. PATENT DOCUMENTS

| | | | |
|---|---|---|---|
| 5,617,230 A * | 4/1997 | Ohgawara et al. ......... 349/110 |
| 5,633,739 A * | 5/1997 | Matsuyama et al. ....... 349/106 |
| 5,734,456 A * | 3/1998 | Takao et al. .............. 349/106 |
| 6,208,394 B1 * | 3/2001 | Tanaka et al. ............. 349/106 |
| 6,242,140 B1 * | 6/2001 | Kwon et al. ................. 430/7 |
| 6,245,469 B1 * | 6/2001 | Shiba et al. .................. 430/7 |
| 6,392,729 B1 * | 5/2002 | Izumi et al. ............... 349/110 |
| 6,798,474 B2 * | 9/2004 | Matsushima et al. ...... 349/110 |
| 7,212,262 B2 * | 5/2007 | Kang ......................... 349/106 |
| 2002/0150698 A1 * | 10/2002 | Kawabata .................. 428/1.1 |
| 2003/0118922 A1 * | 6/2003 | Hayashi et al. .............. 430/7 |
| 2004/0126677 A1 * | 7/2004 | Andrews et al. ............. 430/7 |

FOREIGN PATENT DOCUMENTS

KR    10-1998-0024557    12/1999

OTHER PUBLICATIONS

SID 02 Digest, 34.5: "Thermal Lithography for Flat Panel Display Manufacturing," Eran Elizur and Dan Gilbert, Creo Products Inc., Burnaby B.C., Canada, pp. 1055-1057.

* cited by examiner

*Primary Examiner*—Andrew Schechter
*Assistant Examiner*—(Nancy) Thanh-Nhan P. Nguyen
(74) *Attorney, Agent, or Firm*—McKenna Long & Aldridge LLP (57) ABSTRACT

A color filter substrate for a liquid crystal display device includes: a substrate; red, green and blue sub-color filters made of a transcription film on the substrate and spaced apart from each other; a black matrix on the red, green and blue sub-color filters; an overcoat layer on the black matrix; and a common electrode overcoat layer.

19 Claims, 11 Drawing Sheets

COLOR FILTER SUBSTRATE FOR LIQUID CRYSTAL DISPLAY DEVICE AND FABRICATING METHOD THEREOF

The present invention claims the benefit of Korean Patent Application No. 10-2003-0012539, filed in Korea on Feb. 28, 2003, which is hereby incorporated by reference for all purposes as if fully set forth therein.

BACKGROUND OF THE INVENTION

1. Field of the Invention

The present invention relates to a liquid crystal display device, and more particularly, to a color filter substrate for a liquid crystal display device and a fabricating method thereof.

2. Discussion of the Related Art

With the rapid development in the information technology field, display devices have evolved to be able to process and display increasingly large amounts of information. Flat panel display technologies recently developed for display devices have reduced thickness, light weight, and low power consumption. Among these technologies, liquid crystal display (LCD) devices have been used in notebook computers and desktop computer monitors due to their superior image resolution, color image display, and image quality In general, an LCD device includes an upper substrate, a lower substrate, and a liquid crystal layer disposed between the upper and lower substrates. The LCD device makes use of the optical anisotropy of liquid crystal material and produces images by varying the light transmittance according to the alignment of liquid crystal molecules using an electric field.

The lower substrate, is commonly referred to as an array substrate, and includes thin film transistors and pixel electrodes. It is fabricated using repeated photolithographic processes to pattern thin films. The upper substrate, which is commonly referred to as a color filter substrate, includes a color filter layer for displaying color images. The color filter layer includes sub-color filters of red (R), green (G), and blue (B), and is formed by various methods including, for example, a dyeing method, an electro-deposition method, a pigment dispersion method, and a printing method. In general, the pigment dispersion method is more commonly used because it forms a fine pattern with good reproducibility.

FIGS. 1A to 1E are schematic cross sectional views illustrating a process of fabricating a color filter substrate for a liquid crystal display (LCD) device according to the related art. Here, the pigment dispersion method is used.

Figure 1A:
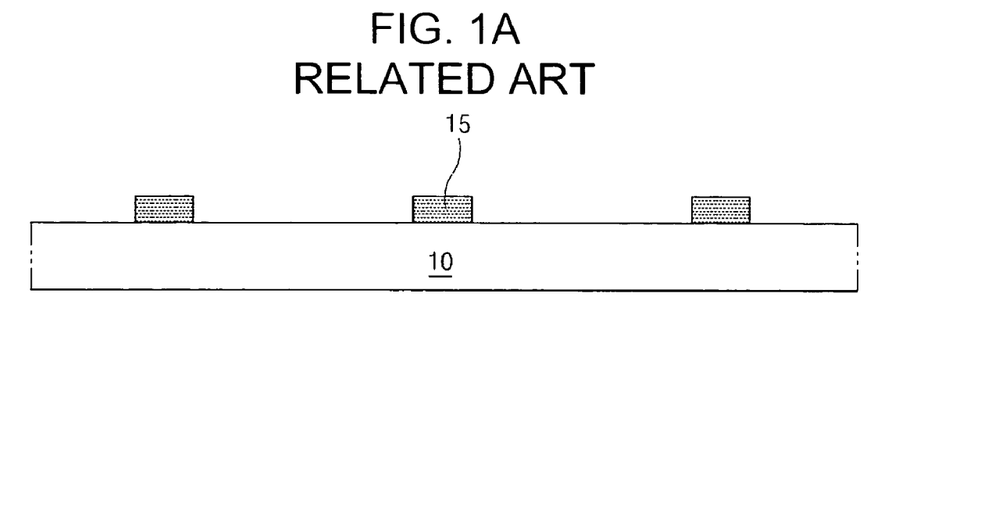
FIGS. 1A to 1E are schematic cross sectional views illustrating a process of fabricating a color filter substrate for a liquid crystal display (LCD) device according to the related art.

In FIG. 1A, a black matrix 15 is formed on a substrate 10 by depositing a metallic material or coating a resin, and patterning the metallic material or the resin through a photolithographic process. The black matrix 15 blocks light leakage caused by irregular operation of liquid crystal molecules within regions of an array substrate other than pixel electrodes (not shown).

Figure 1B:
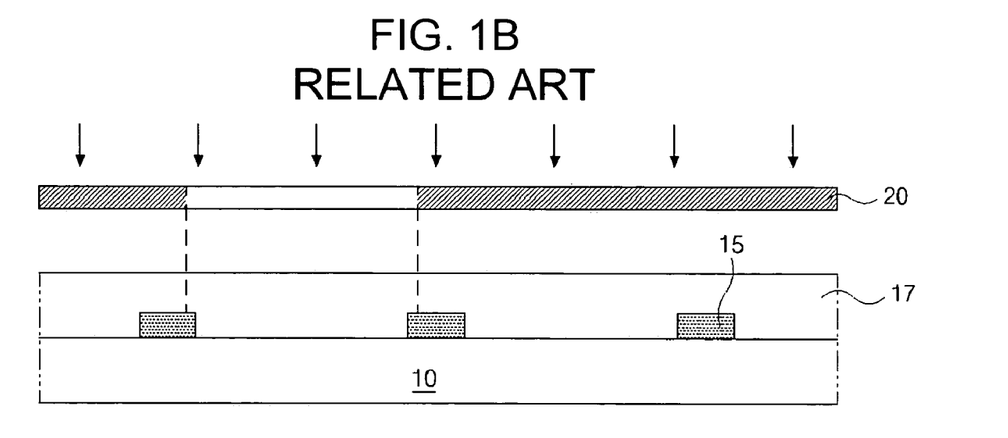

In FIG. 1B, a color resist 17, which may be one of a red, green, or blue resist, (in this example a red one), is coated onto the substrate 10 including the black matrix 15 by spin coating. A mask 20 having a light-transmitting portion and a light-blocking portion is disposed over the red resist 17, and the red resist 17 is exposed to light through the mask 20. Here, the red resist 17 is shown to have a negative property, i.e., a portion of the red resist 17 that is not exposed to light is removed.

Figure 1C:
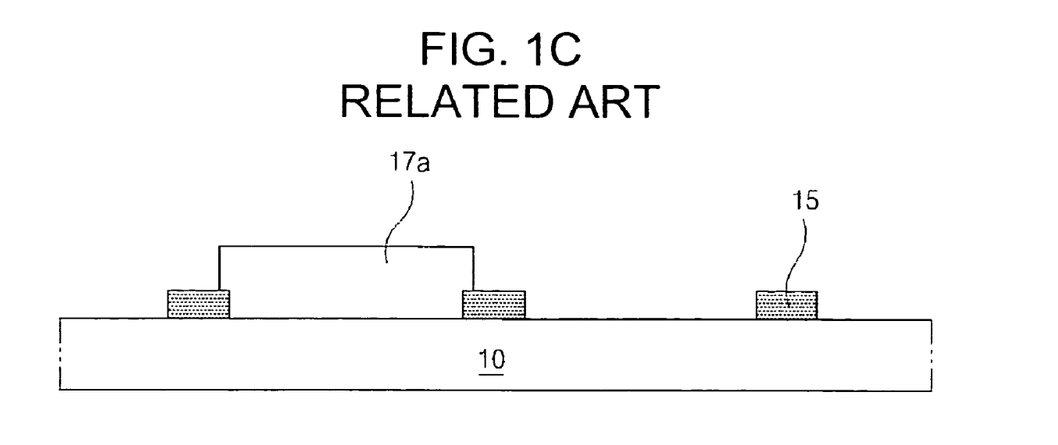

In FIG. 1C, the red resist 17 (of FIG. 1B) is developed, and a red sub-color filter 17a is formed. Then, the red sub-color filter 17a is cured and hardened.

Figure 1D:
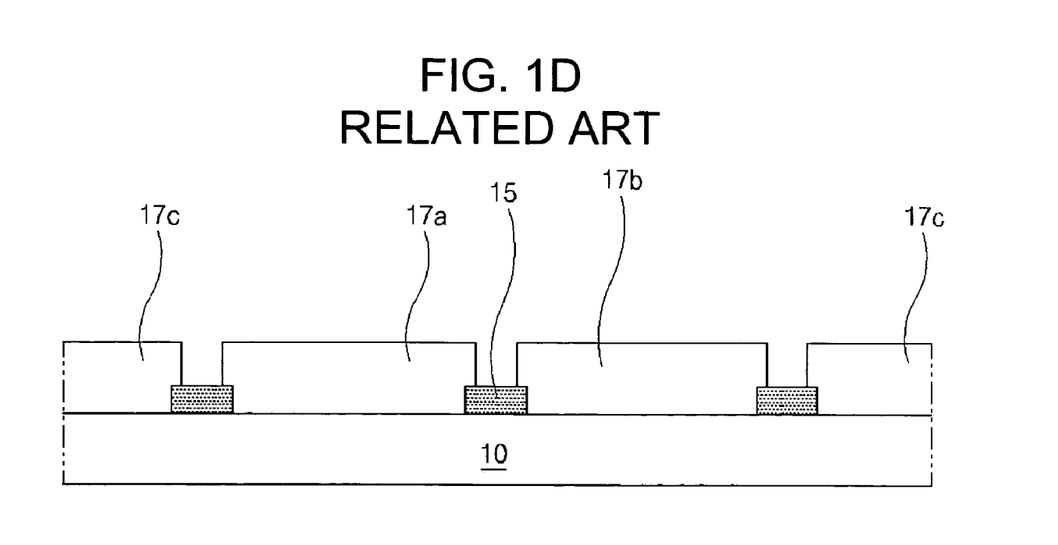

In FIG. 1D, green and blue sub-color filters 17b and 17c are formed on the black matrix 15 through similar processes, as shown in FIGS. 1B and 1C.

Figure 1E:
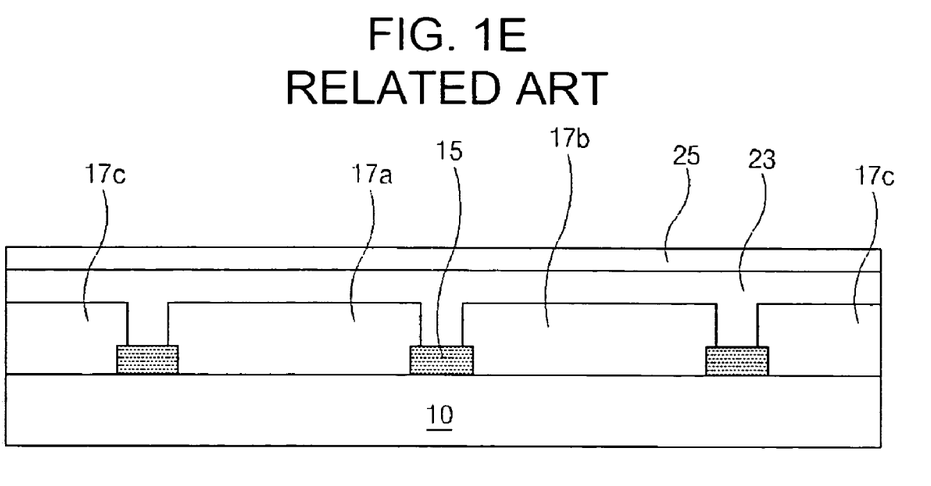

In FIG. 1E, an overcoat layer 23 and a common electrode 25 are subsequently formed on the red, green and blue sub-color filters 17a, 17b, and 17c, respectively. The overcoat layer 23 protects the sub-color filters 17a, 17b, and 17c, and creates a flat top surface over them. The common electrode 25 is made of a transparent conductive material, such as indium-tin-oxide (ITO) or indium-zinc-oxide (IZO).

During the fabrication method of the color filter substrate using pigment dispersion the fabrication method is complicated and requires significant amounts of time and numerous pieces of equipment, because the color filter substrate is fabricated by repeated processes of coating, exposing, developing, and curing of a color resist,. To solve the above problem, a fabrication method of a color filter substrate using thermal imaging has been proposed.

FIGS. 2A to 2F are schematic cross sectional views illustrating a process of fabricating a color filter substrate using a thermal imaging method according to the related art.

Figure 2A:
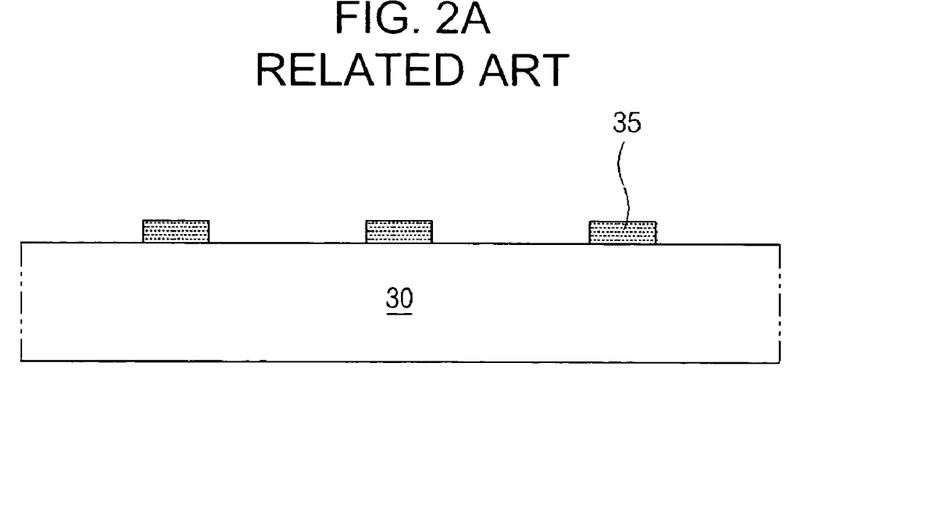
FIGS. 2A to 2F are schematic cross sectional views illustrating a process of fabricating a color filter substrate using a thermal imaging method according to the related art.

In FIG. 2A, a black matrix 35 is formed on a substrate 30 by depositing a metallic material or coating a resin, and patterning the metallic material or the resin by a photolithographic process.

Figure 2B:
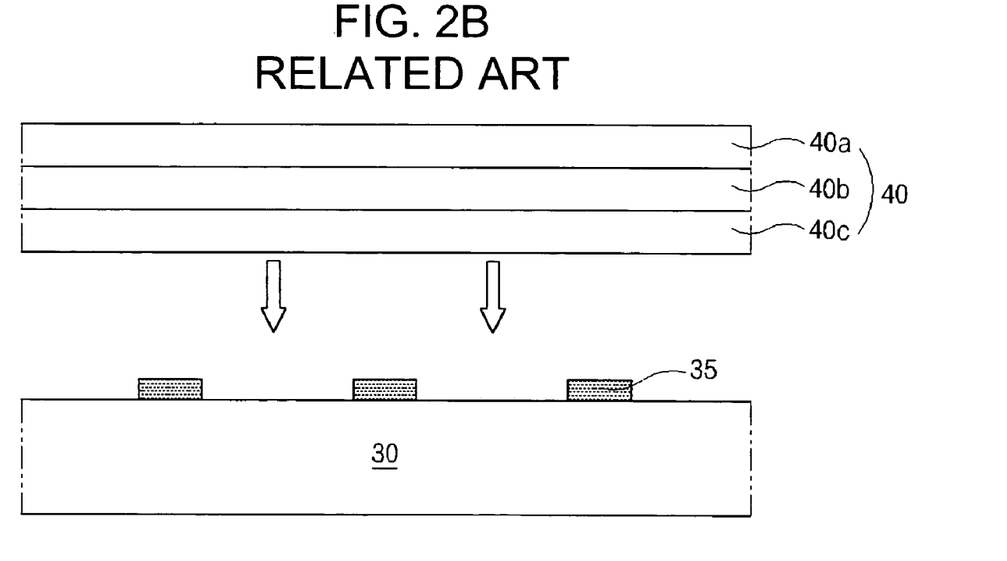

In FIG. 2B, a red transcription film 40 is disposed over the substrate 30 including the black matrix 35. The red transcription film 40 includes a supporting film 40a, a light-to-heat conversion (LTHC) film 40b, and a color filter film 40c.

Figure 2C:
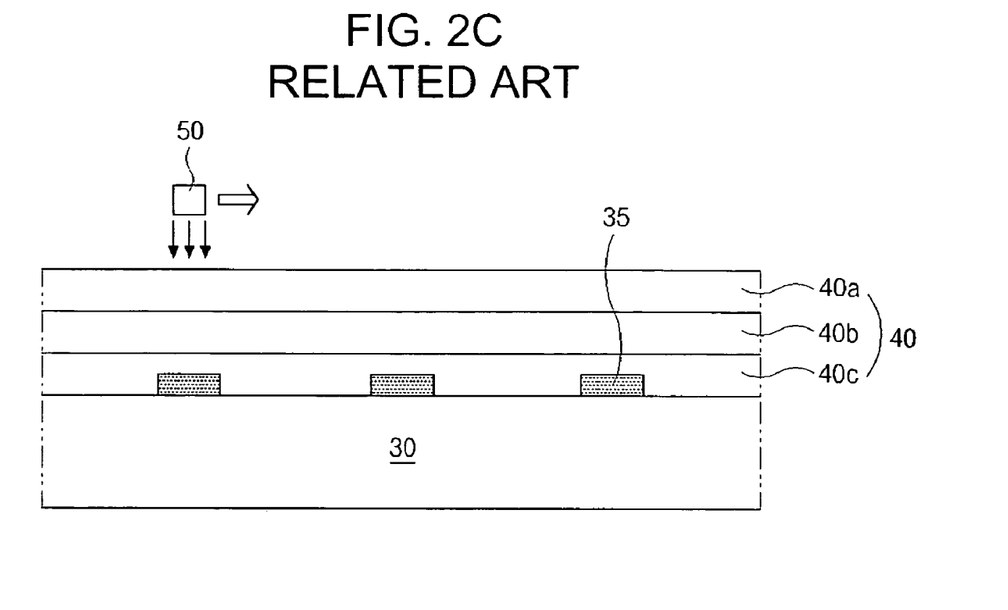

In FIG. 2C, the red transcription film 40 is adhered under vacuum to the substrate 30 without micro bubbles. A laser head 50, from which a laser beam is irradiated, is disposed over the red transcription film 40. Then, the laser beam is applied to the red transcription film 40 within an area where a red color filter pattern will be formed while the laser head 50 is moved along a straight line. In the portion of the red transcription film 40 exposed to the laser beam, the LTHC film 40b transforms light absorbed from the laser beam into thermal energy which is emitted. Accordingly, the color filter film 40c is transferred onto the substrate 30 due to the emitted thermal energy.

Figure 2D:
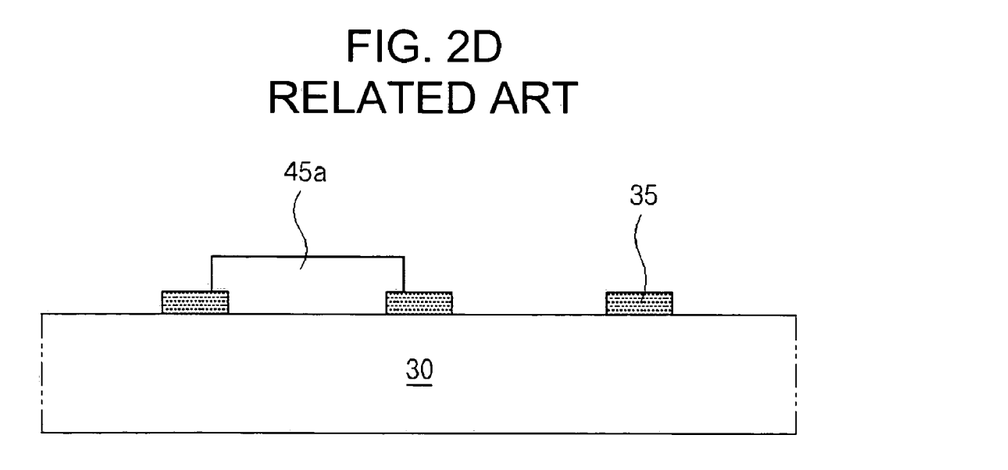

In FIG. 2D, after removing the red transcription film 40, a red sub-color filter 45a is formed between the adjacent black matrices 35 on the substrate 30.

Figure 2E:
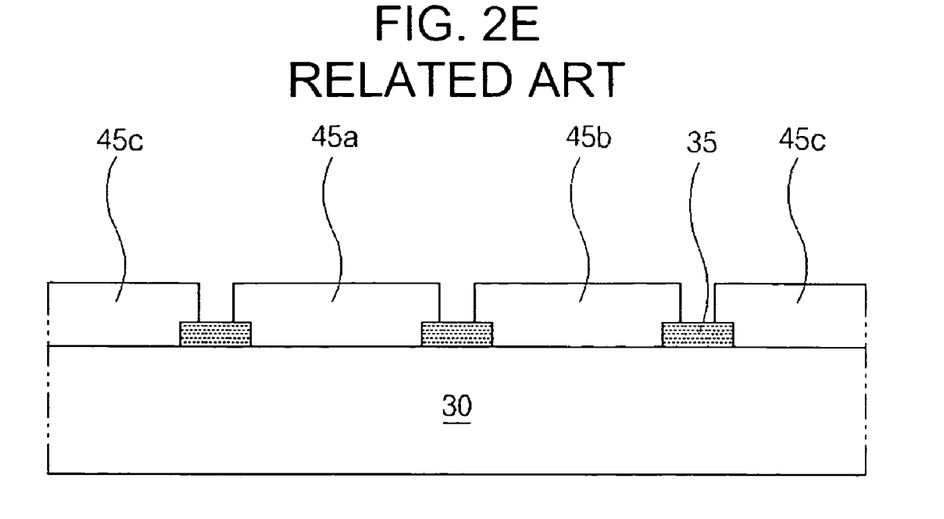

In FIG. 2E, green and blue sub-color filters 45b and 45c are formed through the same process, as shown in FIGS. 2B to 2D. The substrate 30 having the sub-color filters 45a, 45b, and 45c is placed in a hardening furnace, and the sub-color filters 45a, 45b, and 45c are hardened. Three hardening steps for the sub-color filters 45a, 45b, and 45c may be performed after forming each sub-color filter to prevent conglomeration between sub-color filters. However, using three hardening steps may increase process time and production cost.

Figure 2F:
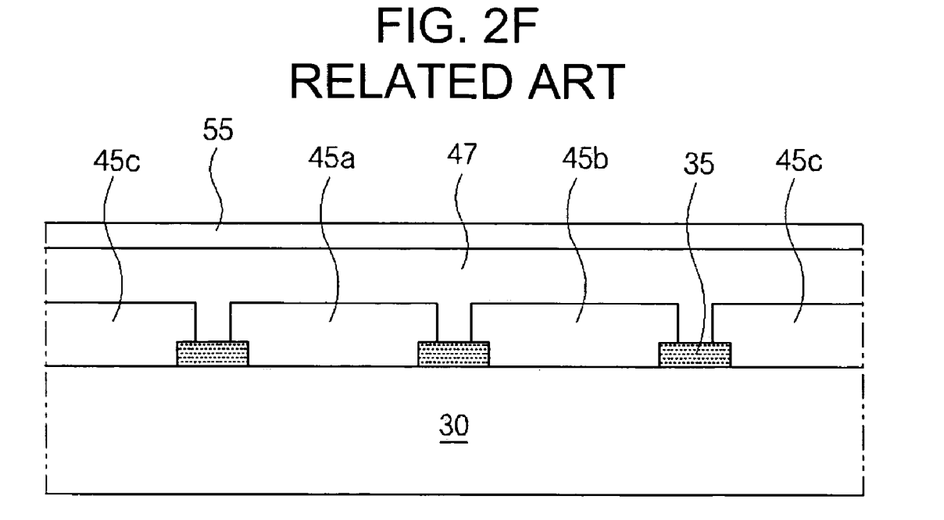

In FIG. 2F, an overcoat layer 47 is formed on the sub-color filters 45a, 45b, and 45c in order to protect the sub-color filters 45a, 45b, and 45c, and to create a flat top surface of the substrate 30. Next, a common electrode 55 is formed on the overcoat layer 47 by depositing a transparent conductive material, such as indium-tin-oxide (ITO) or indium-zinc-oxide (IZO).

Figure 3:
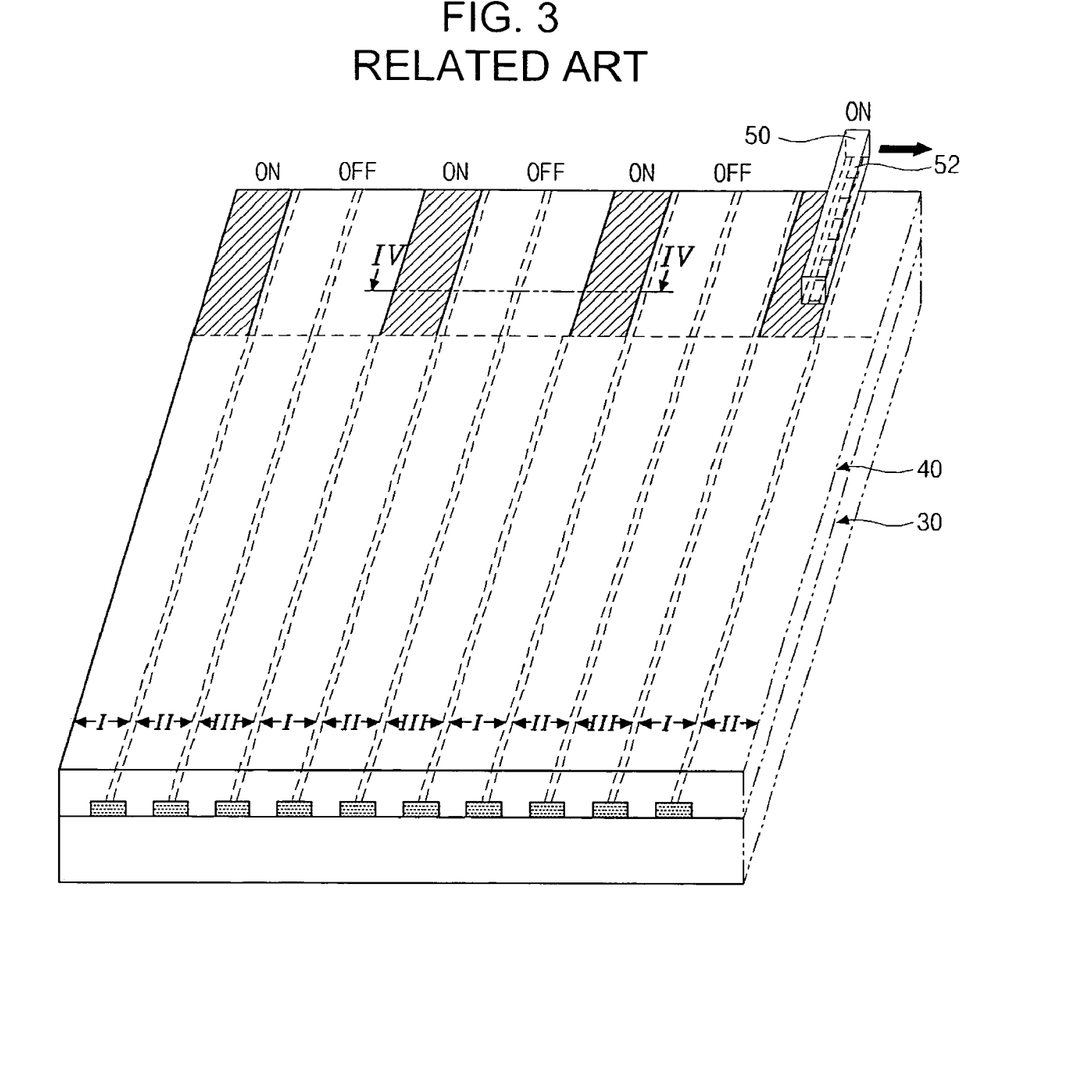
FIG. 3 is a schematic perspective view illustrating a laser beam scanning step of a process of fabricating a color filter substrate using a thermal imaging method according to the related art.

FIG. 3 is a schematic perspective view illustrating a laser beam scanning step of a process of fabricating a color filter substrate using a thermal imaging method according to the related art.

In FIG. 3, a laser head 50 having a plurality of laser pixels 52 scans a substrate 30 along a transverse direction and irradiates a laser beam onto a transcription film 40 by alternately turning the laser ON and OFF. The plurality of laser pixels 52 are turned on in areas where sub-color filters are formed and the laser beam irradiates onto the transcription film 40 in these areas. The plurality of laser pixels 52 are turned off in the other areas. In FIG. 3, for example, the plurality of laser pixels 52 are turned on while the laser head 50 passes over a first area "I" where a red sub-color filter is formed. The plurality of laser pixels 52 are turned off while the laser head 50 passes over second and third areas "II" and "III" where green and blue sub-color filters are formed, respectively. The switching ON and OFF of the plurality of laser pixels 52 may be controlled by a computer according to the speed at which laser head 50 moves, or according to the stage of the fabrication process (not shown).

Figure 4:
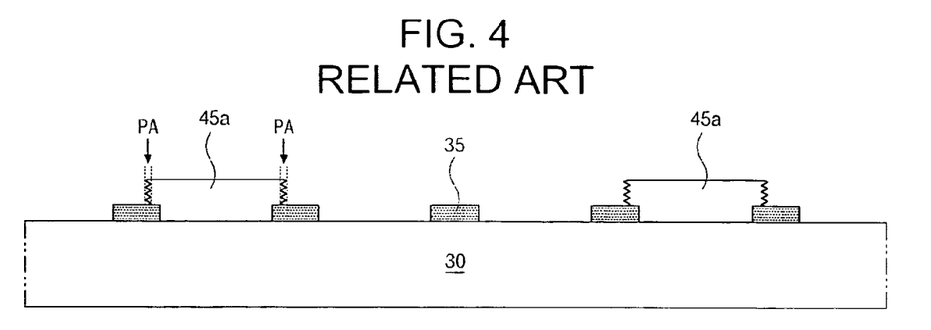
FIG. 4 is a schematic cross sectional view taken along a line "IV-IV" of FIG. 3.

FIG. 4 is a schematic cross sectional view taken along a line "IV-IV" of FIG. 3. In FIG. 4, after removing a transcription film, a red sub-color filter 45a on a substrate 30 is obtained. The red sub-color filter 45a is formed by irradiating a laser beam onto a transcription film by alternately switching the laser ON and OFF. But the energy of the laser beam is not uniform when it is started and stopped. Moreover, heat is diffused in the light-to-heat conversion film of the transcription film. Accordingly, an edge portion "PA" of the red sub-color filter 45a has an indented shape after irradiation due to the non-uniformity of the laser beam and the thermal diffusion. In addition, the edge portion "PA" of the red sub-color filter 45a becomes more indented due to adhesion between the transcription film and the substrate 30 when the transcription film is removed.

Because the indented edge portion "PA" of the red sub-color filter 45a is shielded by a black matrix 35, the indented edge portion "PA" does not cause degradation of the LCD device. However, because an inspection apparatus adjusted to have a high inspection sensitivity classifies the red sub-color filter 45a having the indented edge portion "PA" as a bad one, a color filter substrate on which the red sub-color filter 45a having the indented edge portion "PA" is formed is rejected as a bad substrate. On the other hand, when the inspection apparatus is adjusted to have a low sensitivity, the inspection apparatus does not classify the red sub-color filter 45a having the indented edge portion "PA" as a bad one. However, with the sensitivity reduced, the inspection apparatus can not detect a sub-color filter that is actually bad. Accordingly, an exact yield and an exact inferiority ratio may be not obtained. Moreover, because the color filter substrate classified as a bad one would be re-inspected and re-classified, a loss of time and manpower result. Similar problems arise with the green and blue sub-color filters formed by a thermal imaging method.

SUMMARY OF THE INVENTION

Accordingly, the present invention is directed to a color filter substrate for liquid crystal display device and a fabricating method thereof that substantially obviate one or more of the problems due to limitations and disadvantages of the related art.

An advantage of the present invention is to provide a color filter substrate for a liquid crystal display device where an inspection error is prevented, and a fabricating method thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as in the appended drawings.

To achieve these and other advantages and in accordance with the purpose of the present invention, as embodied and broadly described, a color filter substrate for a liquid crystal display device includes: a substrate; red, green and blue sub-color filters on the substrate and spaced apart from each other; a black matrix on the red, green and blue sub-color filters; an overcoat layer on the black matrix; and a common electrode on the overcoat layer.

In another aspect, a fabricating method of a color filter substrate for a liquid crystal display device includes: forming red, green and blue sub-color filters on a substrate using a thermal imaging method, the red, green and blue sub-color filters being spaced apart from each other; forming a black matrix on the red, green and blue sub-color filters; forming an overcoat layer on the black matrix; and forming a common electrode on the overcoat layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Reference will now be made in detail to an embodiment of the present invention, example of which is illustrated in the accompanying drawings.

Figure 5:
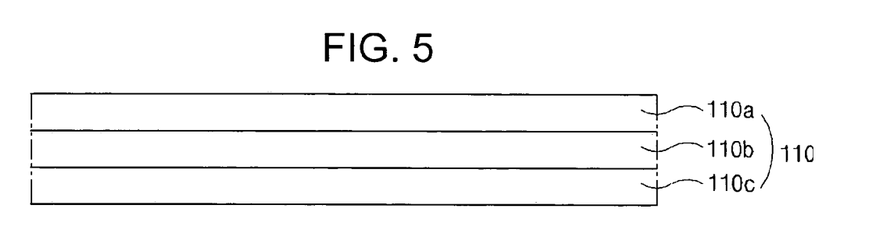
FIG. 5 is a schematic cross-sectional view illustrating a transcription film for a color filter layer of a color filter substrate for a liquid crystal display device according to an embodiment of the present invention.

FIG. 5 is a schematic cross-sectional view illustrating a transcription film for a color filter layer of a color filter substrate for a liquid crystal display device according to an embodiment of the present invention.

In FIG. 5, a transcription film 110 includes a supporting film 110a, a light-to-heat conversion (LTHC) film 110b and a color filter film 110c. The supporting film 110a supports the LTHC film 110b and the color filter film 110c. A laser beam shines through the supporting film 110a to the LTHC film 110b. The supporting film may include a transparent polymer material such as polyester or polyethylene. The LTHC film 110b converts the light energy of the incident laser beam into thermal energy. Accordingly, the LTHC film 110b includes a material having a high thermal convertibility, for example an organic compound such as carbon black or IR(infrared)-pigment, a metallic material such as aluminum, or a metallic oxide or a mixture thereof. The color filter film 110c also includes a material having red, green and blue colors.

Figure 6:
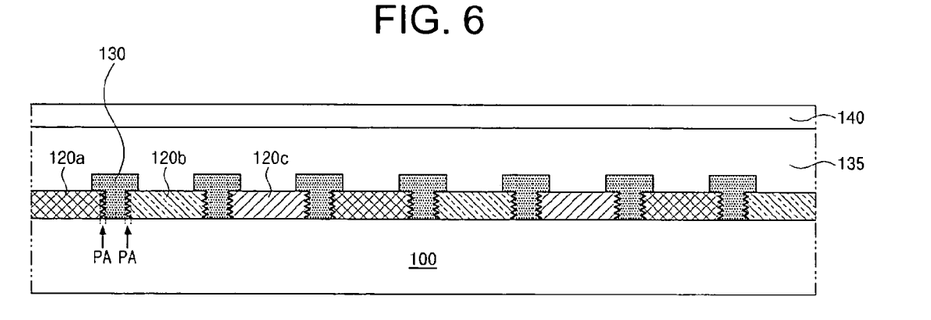
FIG. 6 is a schematic cross-sectional view illustrating a color filter substrate for a liquid crystal display device according to an embodiment of the present invention.

FIG. 6 is a schematic cross-sectional view illustrating a color filter substrate for a liquid crystal display device according to an embodiment of the present invention.

In FIG. 6, red, green and blue sub-color filters 120a, 120b and 120c are formed on a substrate 100 using a thermal imaging method. The red, green and blue sub-color filters 120a, 120b and 120c alternate with and are spaced apart from each other. Each sub-color filter 120a, 120b and 120c may include an indented edge portion "PA" due to a non-uniform application of the laser beam, thermal diffusion in the transcription film, and the adhesion between the transcription film and the substrate. A black matrix 130 of an organic material may be formed at the space between adjacent sub-color filters and on a portion of each of sub-color filters 120a, 120b and 120c. The black matrix 130 entirely covers the indented edge portion "PA" of each sub-color filter 120a, 120b and 120c. An overcoat layer 135 may be formed on the black matrix 130 to protect the red, green and blue sub-color filters 120a, 120b and 120c. In addition, the overcoat layer 135 planarizes top surface of the substrate 100 which includes the sub-color filters 120a, 120b and 120c and the black matrix 130. A common electrode 140 made of a transparent conductive material may be formed on the overcoat layer 135. For example, indium-tin-oxide (ITO) or indium-zinc-oxide (IZO) may be used as the material for the common electrode 140.

FIGS. 7A to 7F are schematic cross-sectional views illustrating a process for fabricating a color filter substrate for a liquid crystal display device according to an embodiment of the present invention.

Figure 7A:
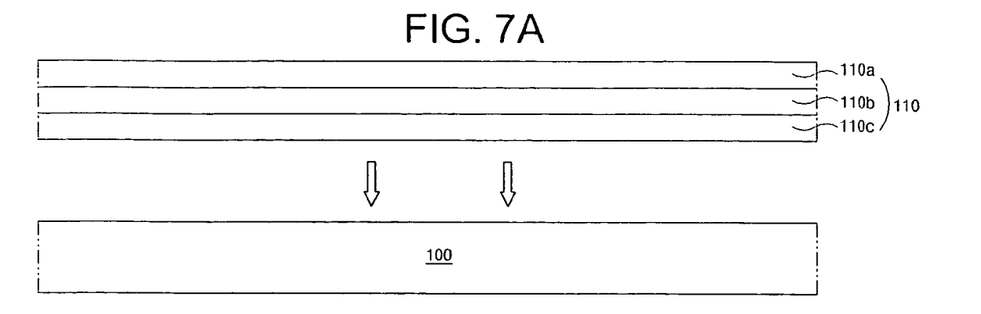
FIGS. 7A to 7F are schematic cross-sectional views illustrating a fabricating process of a color filter substrate for a liquid crystal display device according to an embodiment of the present invention.

In FIG. 7A, a first transcription film 110, including a supporting film 110a, a light-to-heat conversion (LTHC) film 110b and a color filter film 110c, is placed over a substrate 100. The first transcription film 110 may be attached onto the substrate 100 under vacuum pressure to prevent generation of micro-bubbles. The first transcription film may have one of red, green and blue colors.

Figure 7B:
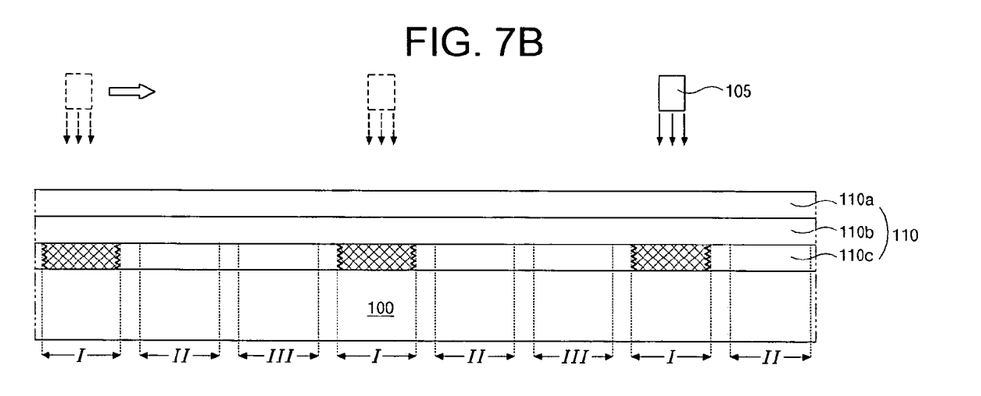

In FIG. 7B, the substrate 100 having the first transcription film 110 thereon may be placed on a stage of a laser generator (not shown), and a laser head 105 of the laser generator may be aligned to a starting position of the substrate 100. Next, the laser head 105 may scan the substrate 100 along a first direction by moving the stage (not shown) or the laser head 105 and may irradiate a laser beam onto the first transcription film 110. The laser head 105 may include a plurality of laser pixels (not shown) which are alternately switched ON and OFF while the laser head 105 scans the substrate 100. For example, the substrate 100 is designed to have first, second and third sub-pixel regions "I," "II" and "III" along the first direction, so the laser head 105 scans the substrate 100 along that first direction. To form a first sub-color filter in the first sub-pixel region "I," the laser beam irradiates the first transcription film 110 in the first sub-pixel region "I" and the laser beam does not irradiate the first transcription film 110 in the second and third sub-pixel regions "II" and "III." In this manner, the plurality of laser pixels alternately switches ON and OFF while the stage or the laser head 105 moves along in the first direction.

Figure 7C:
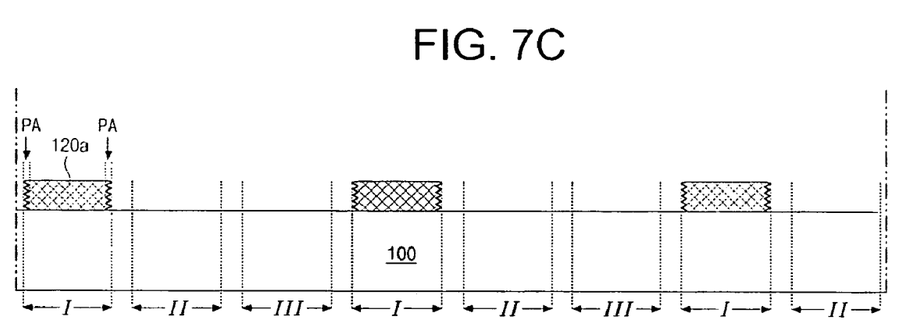

In FIG. 7C, the first transcription film 110 is removed to form a first sub-color filter 120a in the first sub-pixel region "I" after the laser scanning step is finished. The first sub-color filter 120a may have an indented or rough edge portion "PA", because the energy of the laser beam is not constant when the laser beam is alternately started and stopped. Moreover, because heat is diffused in the LTHC film 110b (of FIG. 7B), the light-to-heat converted portion is larger than the irradiated portion. Because the edge of the light-to-heat converted portion is heated less than the center, the edge of the light-to-heat converted portion has a lower thermal convertibility than the center thereof. Accordingly, the edge portion "PA" of the first sub-color filter 120a becomes rough or indented. The width of the indented edge portion "PA" is between about 3 µm and 5 µm.

Figure 7D:
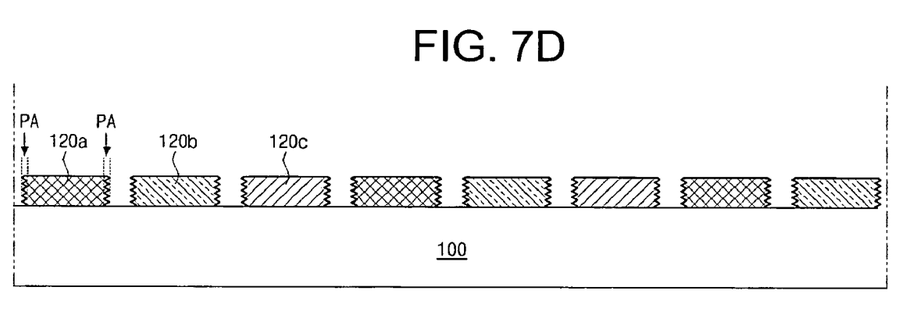

In FIG. 7D, second and third sub-color filters 120b and 120c are formed on the substrate 100 through the same steps as shown in FIGS. 7A to 7C. Where the first color filter was red, the second and third sub-color filters 120b and 120c may have green and blue colors, respectively. After the color filters are formed, the substrate 100 having the first, second and third sub-color filters 120a, 120b, and 120c is placed in a hardening furnace, and the sub-color filters 120a, 120b, and 120c are hardened under a temperature of about 200° C. to 300° C. Three individual hardening steps for the sub-color filters 120a, 120b, and 120c may be performed after forming each sub-color filter. In other words, after forming the first sub-color filter 120a by a thermal imaging method, a first hardening step may be performed for the first sub-color filter 120a. Next, after forming the second sub-color filter 120b by a thermal imaging method, a second hardening step may be performed for the second sub-color filter 120b. Similarly, after forming the third sub-color filter 120c by a thermal imaging method, a third hardening step may be performed for the third sub-color filter 120c. The three individual hardening steps prevent conglomeration between sub-color filters.

Figure 7E:
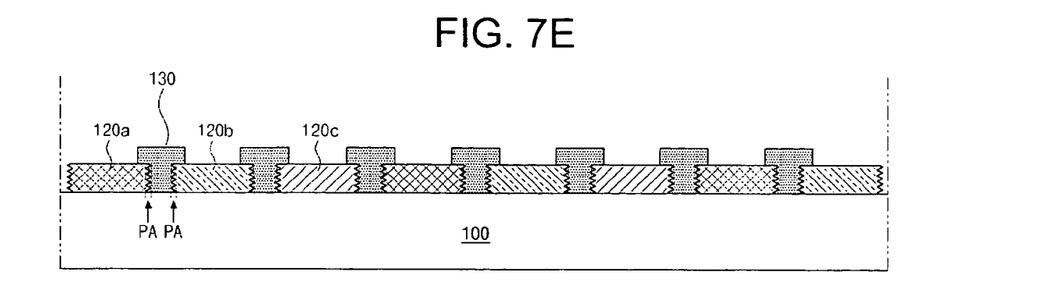

In FIG. 7E, a black matrix 130 is formed in a space between the adjacent sub-color filters and on a portion of the first, second and third sub-color filters 120a, 120b and 120c. The black matrix 130 entirely covers the indented edge portion "PA" of each sub-color filter 120a, 120b and 120c. The black matrix 130 includes a metallic material such as chromium (Cr) and chromium oxide (CrOx). Generally, the metallic material for the black matrix 130 is deposited on the sub-color filters 120a, 120b and 120c and then is etched with an etching solution. To prevent damage to the sub-color filters 120a, 120b and 120c during the deposition and etching steps, the black matrix 130 may be formed of a photosensitive organic material using a photolithographic process. For example, a black resin including a pigment such as carbon black or an epoxy resin may be used for the black matrix 130. The position of the black matrix 130 corresponds to a space between adjacent sub-pixel regions (not shown) of an LCD device and blocks light leakage caused by irregular operation of liquid crystal molecules. The black matrix may have a width of about 15 µm to about 30 µm.

Figure 7F:
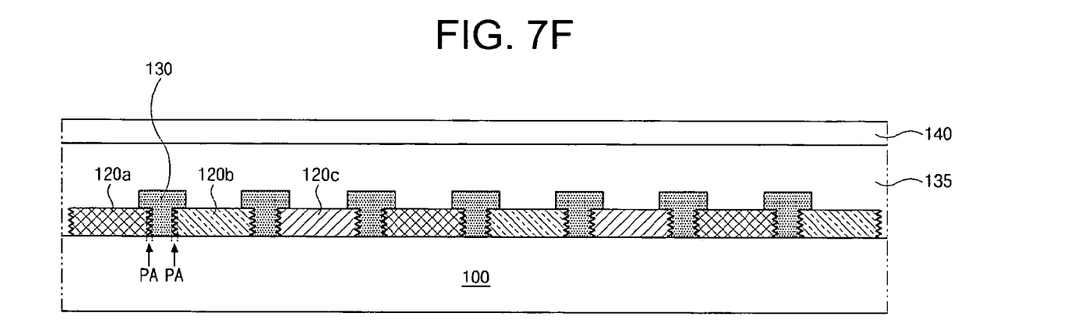

In FIG. 7F, an overcoat layer 135 is formed on the black matrix 130 to protect the first, second and third sub-color filters 120a, 120b and 120c and planarize a top surface of the substrate 100 including the black matrix 130 and the first, second and third sub-color filters 120a, 120b and 120c. A common electrode 140 of a transparent conductive material such as indium-tin-oxide (ITO) or indium-zinc-oxide (IZO) is formed on the overcoat layer 135.

Because a color filter layer is formed on a substrate using a thermal imaging method and then a black matrix is formed in the space between adjacent sub-color filters to entirely cover the indented edge portion of each sub-color filter, an inspection apparatus does not classify the sub-color filter having the indented edge portion as a bad one. Therefore, an exact yield and an exact inferiority ratio may be obtained. Moreover, the loss of time and manpower may be prevented.

It will be apparent to those skilled in the art that various modifications and variations can be made in a liquid crystal display device and a fabricating method thereof of the present invention without departing from the spirit or scope of the invention. Thus, it is intended that the present invention cover the modifications and variations of this invention provided they come within the scope of the appended claims and their equivalents.

What is claimed is:

1. A color filter substrate for a liquid crystal display device, comprising:
    a substrate;
    a transcription film on the substrate having red, green and blue sub-color filters spaced apart from each other wherein each of the red, green and blue sub-color filters has a substantially jagged indented edge portion;
    a black matrix on the red, green and blue sub-color filters;
    an overcoat layer on the black matrix; and
    a common electrode on the overcoat layer,
    wherein the black matrix overlaps an upper surface of the sub-color filters.

2. The substrate according to claim 1, wherein each of the red, green and blue sub-color filters is a vacuum-pressure attached transcription film attached to the substrate.

3. The substrate according to claim 1, wherein the black matrix is in a space between the adjacent sub-color filters.

4. The substrate according to claim 1, wherein the black matrix includes a photosensitive organic material.

5. The substrate according to claim 4, wherein the photosensitive organic material is one of a photosensitive resin and an epoxy resin including pigment.

6. The substrate according to claim 1, wherein the black matrix entirely covers the substantially jagged indented edge portion.

7. The substrate according to claim 6, wherein the black matrix has a width of about 15 μm to about 30 μm.

8. A fabricating method of a color filter substrate for a liquid crystal display device, comprising:
    forming red, green and blue sub-color filters on a substrate using a thermal imaging method, the red, green and blue sub-color filters being spaced apart from each other;
    forming a black matrix on the red, green and blue sub-color filters;
    forming an overcoat layer on the black matrix; and
    forming a common electrode on the overcoat layer.

9. The method according to claim 8, wherein the black matrix is formed in a space between the adjacent sub-color filters.

10. The method according to claim 8, wherein the step of forming the red, green and blue sub-color filters includes:
    attaching a red transcription film on the substrate;
    irradiating a laser beam onto the red transcription film corresponding to a red sub-pixel region;
    removing the red transcription film from the substrate to form the red sub-color filter;
    attaching a green transcription film on the substrate;
    irradiating a laser beam onto the green transcription film corresponding to a green sub-pixel region;
    removing the green transcription film from the substrate to form the green sub-color filter;
    attaching a blue transcription film on the substrate;
    irradiating a laser beam onto the blue transcription film corresponding to a blue sub-pixel region;
    removing the blue transcription film from the substrate to form the blue sub-color filter; and
    hardening the red, green and blue sub-color filters.

11. The method according to claim 10, wherein the step of hardening the red, green and blue sub-color filters is performed under a temperature of about 200° C. to about 300° C.

12. The method according to claim 8, wherein the step of forming the red, green and blue sub-color filters includes:
    attaching a red transcription film on the substrate;
    irradiating a laser beam onto the red transcription film corresponding to a red sub-pixel region;
    removing the red transcription film from the substrate to form the red sub-color filter;
    hardening the red sub-color filter;
    attaching a green transcription film on the substrate;
    irradiating a laser beam onto the green transcription film corresponding to a green sub-pixel region;
    removing the green transcription film from the substrate to form the green sub-color filter;
    hardening the green sub-color filter;
    attaching a blue transcription film on the substrate;
    irradiating a laser beam onto the blue transcription film corresponding to a blue sub-pixel region;
    removing the blue transcription film from the substrate to form the blue sub-color filter; and
    hardening the blue sub-color filter.

13. The method according to claim 8, wherein the black matrix includes a photosensitive organic material.

14. The method according to claim 13, wherein the photosensitive organic material is one of a photosensitive resin and an epoxy resin including pigment.

15. The method according to claim 8, wherein each of the red, green and blue sub-color filters has an indented edge portion.

16. The method according to claim 15, wherein the black matrix entirely covers the indented edge portion.

17. The method according to claim 16, wherein the black matrix has a width of about 15 μm to about 30 μm.

18. A color filter substrate for a liquid crystal display device, comprising:
    a substrate;
    a thermal-imageable transcription film on the substrate having red, green and blue sub-color filters spaced apart from each other;
    a black matrix on the red, green and blue sub-color filters;
    an overcoat layer on the black matrix; and
    a common electrode on the overcoat layer,
    wherein the black matrix overlaps an upper surface of the sub-color filters.

19. The substrate according to claim 18, wherein each of the red, green and blue sub-color filters has a substantially indented edge portion.

* * * * *